United States Patent
Steinmeyer

(10) Patent No.: US 7,207,178 B2
(45) Date of Patent: Apr. 24, 2007

(54) SUPERCONDUCTING DEVICE WITH A COOLING-UNIT COLD HEAD THERMALLY COUPLED TO A ROTATING SUPERCONDUCTIVE WINDING

(75) Inventor: Florian Steinmeyer, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 425 days.

(21) Appl. No.: 10/432,380

(22) PCT Filed: Nov. 14, 2001

(86) PCT No.: PCT/DE01/04265

§ 371 (c)(1),
(2), (4) Date: Oct. 6, 2003

(87) PCT Pub. No.: WO02/43224

PCT Pub. Date: May 30, 2002

(65) Prior Publication Data

US 2004/0056541 A1    Mar. 25, 2004

(30) Foreign Application Priority Data

Nov. 21, 2000   (DE) ................. 100 57 664

(51) Int. Cl.
*F25B 9/00*     (2006.01)
*F25B 19/00*    (2006.01)
*F25D 23/12*    (2006.01)
*H02K 9/00*     (2006.01)

(52) U.S. Cl. .................. 62/6; 62/51.1; 62/259.2; 505/878; 310/52; 310/179

(58) Field of Classification Search ............. 62/51.1, 62/259.2, 6; 310/52, 179; 505/878; 165/104.21
See application file for complete search history.

(56) References Cited

U.S. PATENT DOCUMENTS

| 4,123,677 | A |   | 10/1978 | Laskaris et al. |
| 4,226,282 | A | * | 10/1980 | Kunsagi et al. ......... 165/104.14 |
| 4,360,058 | A | * | 11/1982 | Muellejans ............ 165/104.21 |
| 5,482,919 | A |   | 1/1996  | Joshi |

(Continued)

FOREIGN PATENT DOCUMENTS

JP          56-43276           9/1981

(Continued)

OTHER PUBLICATIONS

Patent Abstracts of Japan, Publication No. 09074716, Publication Date: Mar. 18, 1997.

(Continued)

*Primary Examiner*—William C. Doerrler
(74) *Attorney, Agent, or Firm*—Staas & Halsey LLP

(57) ABSTRACT

The superconducting device has a rotor which is rotatable about an axis of rotation and is provided with a superconductive winding in a heat conducting winding carrier. The winding carrier has a central cooling agent cavity with a lateral cavity leading out of the winding carrier connected thereto. A cold head associated with a cooling unit is connected to a condenser unit which condenses the cooling agent. A fixed heat tube guiding the cooling agent is coupled to the condenser unit, protruding axially into the coorotating lateral cavity and is sealed in relation thereto.

25 Claims, 2 Drawing Sheets

U.S. PATENT DOCUMENTS

| | | | |
|---|---|---|---|
| 5,485,730 A * | 1/1996 | Herd | 62/51.1 |
| 6,062,299 A * | 5/2000 | Choo et al. | 165/46 |
| 6,376,943 B1 * | 4/2002 | Gamble et al. | 310/52 |
| 6,489,701 B1 * | 12/2002 | Gamble et al. | 310/179 |
| 2003/0107275 A1 * | 6/2003 | Gamble et al. | 310/52 |

FOREIGN PATENT DOCUMENTS

| | | |
|---|---|---|
| JP | 59-059042 | 4/1984 |
| JP | 59-070166 | 4/1984 |
| JP | 3-284156 | 12/1991 |
| JP | 4-25471 | 2/1992 |
| JP | 10-052029 | 2/1998 |

OTHER PUBLICATIONS

Proceedings of the Sixteenth International Cryogenic Engineering Conference/International Cryogenic Materials Conference, 1997, pp. 1109-1132.

Proceedings of the Sixteenth International Cryogenic Engineering Conference/International Cryogenic Materials Conference, 1996, pp. 33-44.

* cited by examiner

SUPERCONDUCTING DEVICE WITH A COOLING-UNIT COLD HEAD THERMALLY COUPLED TO A ROTATING SUPERCONDUCTIVE WINDING

CROSS REFERENCE TO RELATED APPLICATIONS

This application is based on and hereby claims priority to PCT Application No. PCT/DE01/04265 filed on 14 Nov. 2001 and German Application No. 100 57 664.8 filed on 21 Nov. 2000, the contents of which are hereby incorporated by reference.

BACKGROUND OF THE INVENTION

The invention relates to a superconducting device having a rotor which is mounted such that it can rotate about a rotation axis and has at least one superconducting winding, whose conductors are arranged in a winding mount which is designed to be thermally conductive, and having a refrigeration unit which has at least one cold head which is thermally coupled to the winding via parts which conduct heat. A corresponding device is disclosed in U.S. Pat. No. 5,482,919.

In addition to metallic superconductor materials such as NbTi or $Nb_3Sn$ which have been known for a long time and have very low critical temperatures $T_c$ and which are therefore also referred to as low $T_c$ superconductor materials or LTS materials, metal-oxide superconductor materials with critical temperatures above 77 K have been known since 1987. The latter materials are referred to as high-$T_c$ superconductor materials, or HTS materials, and in principle allow a refrigeration technique using liquid nitrogen ($LN_2$).

Attempts have also been made to create superconducting windings with conductors using such HTS materials. However, it has been found that already known conductors can carry only a comparatively small amount of current in magnetic fields with inductions in the Tesla range. This often means that it is necessary to keep the conductors of windings such as these at a temperature level below 77 K, for example between 10 and 50 K, despite the intrinsically high critical temperatures of the materials being used in order in this way to make it possible to carry significant currents at field strengths of several Tesla. A temperature level such as this is admittedly on the one hand considerably higher than 4.2 K, the boiling temperature of liquid helium (LHe) with which known metallic superconductor elements such as $Nb_3Sn$ are cooled. On the other hand, however, cooling with $LN_2$ is uneconomic due to the high conductor losses. Other liquefied gases such as hydrogen with a boiling temperature of 20.4 K or neon with a boiling temperature of 27.1 K cannot be used owing to their danger or their lack of availability.

Refrigeration units in the form of cryogenic coolers with closed helium compressed gas circuits are therefore preferably used for cooling windings with HTS conductors in the temperature range. Cryogenic coolers such as these are, in particular, in the form of the Gifford-McMahon or Stirling type, or are in the form of so-called pulse tube coolers. Refrigeration units such as these also have the advantage that the refrigeration performance is available virtually at the push of a button, and there is no need for the user to handle cryogenic liquids. When refrigeration units such as these are used, a superconducting device such as a magnet coil or a transformer winding is cooled only indirectly by heat conduction to a cold head of a refrigerator (see, for example, "Proc. $16^{th}$ Int. Cryog. Engng. Conf. (ICEC 16)", Kitakyushu, J P, 20. -24.05.1996, Verlag Elsevier Science, 1997, pages 1109 to 1129).

A corresponding cooling technique is also provided for the superconducting rotor of an electrical machine which is disclosed in the US-A document mentioned initially. The rotor contains a rotating winding composed of HTS conductors, which can be kept at a desired operating temperature of between 30 and 40 K by a refrigeration unit which is in the form of a Stirling, Gifford-McMahon or pulse tube cooler. In a specific embodiment for this purpose, the refrigeration unit contains a cold head which also rotates, is not described in any more detail in the document, and whose colder side is thermally coupled to the winding indirectly, via elements which conduct heat. Furthermore, the refrigeration unit of the known machine contains a compressor unit which is located outside its rotor and supplies the cold head with the necessary working gas via a rotating coupling, which is not described in any more detail, of a corresponding transfer unit. The coupling also supplies the necessary electrical power via two sliprings to a valve drive, which is integrated in the cold head, of the refrigeration unit. This concept makes it necessary for at least two gas connections to be routed coaxially in the transfer unit and means that it is necessary to provide at least two electrical sliprings. Furthermore, the accessibility to the rotating parts of the refrigeration unit and, in particular, to the valve drive in the rotor of the machine is impeded, since the rotor housing must be open when servicing is necessary. Furthermore, the operation of a known valve drive with fast rotation, as in the case of synchronous motors or generators, is not assured.

Against the background of this related art, one possible object of the present invention is to refine the device having the features mentioned initially such that reliable and economic operation of the refrigeration unit both when at rest and when the rotor is rotating is ensured by it in a temperature range below 77 K, with comparatively reduced hardware complexity.

The superconducting device accordingly has a rotor which is mounted such that it can rotate about a rotation axis and has at least one superconducting winding, whose conductors are arranged in a thermally conductive winding mount, as well as a refrigeration unit which has at least one cold head that is thermally coupled to the winding via parts which conduct heat. In this case, the superconducting device should have the following features, namely in that the winding mount is equipped with a central, cylindrical cavity which extends in the axial direction and to which a lateral cavity is connected which leads out of the winding mount, in that the cold head is located in a fixed manner outside the rotor and is thermally connected to a condenser unit for condensation of a refrigerant, in that a stationary heat pipe is coupled to the condenser unit, which pipe projects axially into the corotating lateral cavity and seals off this area, and in that the heat pipe, the lateral cavity and the central cavity are filled with coolant, with condensed refrigerant being passed via the heat pipe into the lateral cavity and from there into the central cavity, and refrigerant which is vaporized there being passed back via the lateral cavity and the heat pipe to the condenser unit.

In consequence, in the refinement of the superconducting device, the entire refrigeration unit is arranged with any moving parts outside the rotor, and is thus easily accessible at any time. The refrigeration power and the heat transfer are provided by a stationary cold head in the rotor via the heat pipe, which ensures that the refrigerant is transported without any mechanically moving parts. In this case, the refrigerant is condensed, with heat being emitted, in a circulating process in a condenser unit, which is connected in a highly thermally conductive manner to the cold head. The liquid condensate then runs through the heat pipe into the lateral cavity and from there into the central cavity in the rotor. The condensate is transported through the heat pipe under the influence of the force of gravity on the basis of a so-called thermosyphon effect, and/or by the capillary force of the inner wall of the heat pipe. In this context, this pipe acts in a manner which is known per se as a "wick". This function can also be optimized by appropriate refinement or cladding of the inner wall. The condensate drips into the lateral cavity at the end of the heat pipe. This condensate, which is passed from this lateral cavity into the central cavity, which is located in the region of the winding, is at least partially vaporized there. The refrigerant, which is vaporized in this way with heat being absorbed, then flows through the interior of the heat pipe back into the condenser device. The return flow is in this case driven by a slight overpressure in the central cavity, which acts as an evaporator part, relative to the parts of the condenser unit which act as a condenser. This reduced pressure, which is produced by the creation of gas in the evaporator and by the liquefaction in the condenser, leads to the desired refrigerant return flow. Corresponding refrigerant flows are known from so-called heat pipes.

SUMMARY OF THE INVENTION

The advantages of this refinement are, inter alia, that there is no need for any moving parts, such as fans or pumps, to circulate the refrigerant. Furthermore, only a single thermally insulating heat (transport) pipe, which can be designed to be relatively thin, is required to circulate the refrigerant. This reduces the complexity, particularly of the rotating seal, which seals the gas area of the refrigerant from the external area of the rotor. A seal, which is thus only comparatively small, is more reliable and requires less servicing since its circumferential speed is lower. In this case, gas losses of the refrigerant from the internal area to the external area have no significant influence on the operation of the heat pipe, since the amount of liquid in the system is effected only to a minor extent. In consequence, long lives can be achieved with an adequate reservoir size. Furthermore, the refrigeration unit can easily be matched to the different requirements of machine installation. In particular, depending on the configuration, a heat pipe with a length of many meters can be provided so that, for example, a refrigeration machine can be installed at an accessible point in order to simplify its servicing, while the actual motor or generator is installed in a location where access is difficult. The heat transfer and the provision of the refrigeration power are thus particularly simple and economic with the refinement, in particular since only a comparatively simple seal is required.

It is thus possible to seal the refrigerant area in a particularly simple manner, such that the central cavity is closed on one side by the winding mount, and the lateral cavity is sealed on the side facing the cold head by a sealing device with rotating parts. In this case, at least one seal from the group of ferro fluid seals, labyrinth seals, gap seals may be used as the sealing device.

Virtually any type of refrigeration machine may be provided as the refrigeration unit which have a cold head which can be kept at a predetermined temperature level. Cryogenic coolers, in particular those with a closed helium compressed gas circuit, are preferably provided, since their design is simple and they are particularly suitable for an indirect cooling technique as in the case of the superconducting device according to the invention. Appropriate coolers, which are also referred to as regenerative cryogenic coolers, have a regenerator or regenerative operating cycle corresponding to the normal classification of cryogenic coolers (see, for example, the cited Proceedings volume, pages 33 to 44).

The cold head can particularly advantageously be designed to have two or more stages. In particular, parts of an electricity supply or a thermal radiation shield can then in particular be kept at a comparatively high intermediate temperature by its first stage. An appropriately designed cold head thus allows stationary parts of the superconducting device in each case to be kept at a temperature level which is advantageous for effective cooling, in a simple manner.

Furthermore, it may be regarded as being advantageous if the winding to be cooled, and thus its superconductor material, can be kept at a temperature below 77 K, preferably between 20 and 50 K when using HTS material. This is because known HTS materials have a critical current density that is sufficient for normal applications in this temperature range, which can be maintained with comparatively limited cooling effort. The required refrigeration power can be applied without problems for the superconducting device . By way of example, it is in the range from a few tens of watts at 20 K to 30 K for a synchronous machine of a size equivalent to a mechanical power of about 1 to 20 MW.

It is also advantageous for the heat pipe to be formed as a dripping edge at its end which projects into the lateral cavity. This makes it easier for the condensate to enter the lateral cavity. The refinement can also be implemented in such a way that the process of the droplets dripping off is assisted by rotation, by the gas movement in the rotating internal area resulting from the wind formed by the gaseous part of the refrigerant.

Furthermore, it may be regarded as being advantageous for the lateral cavity to widen in the direction of the central cavity. This is because it may also be possible to make use of the force of gravity or centrifugal force to assist the transport of the refrigerant, with the transport route of the refrigerant thus being inclined such that it points outward with respect to the rotation axis.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
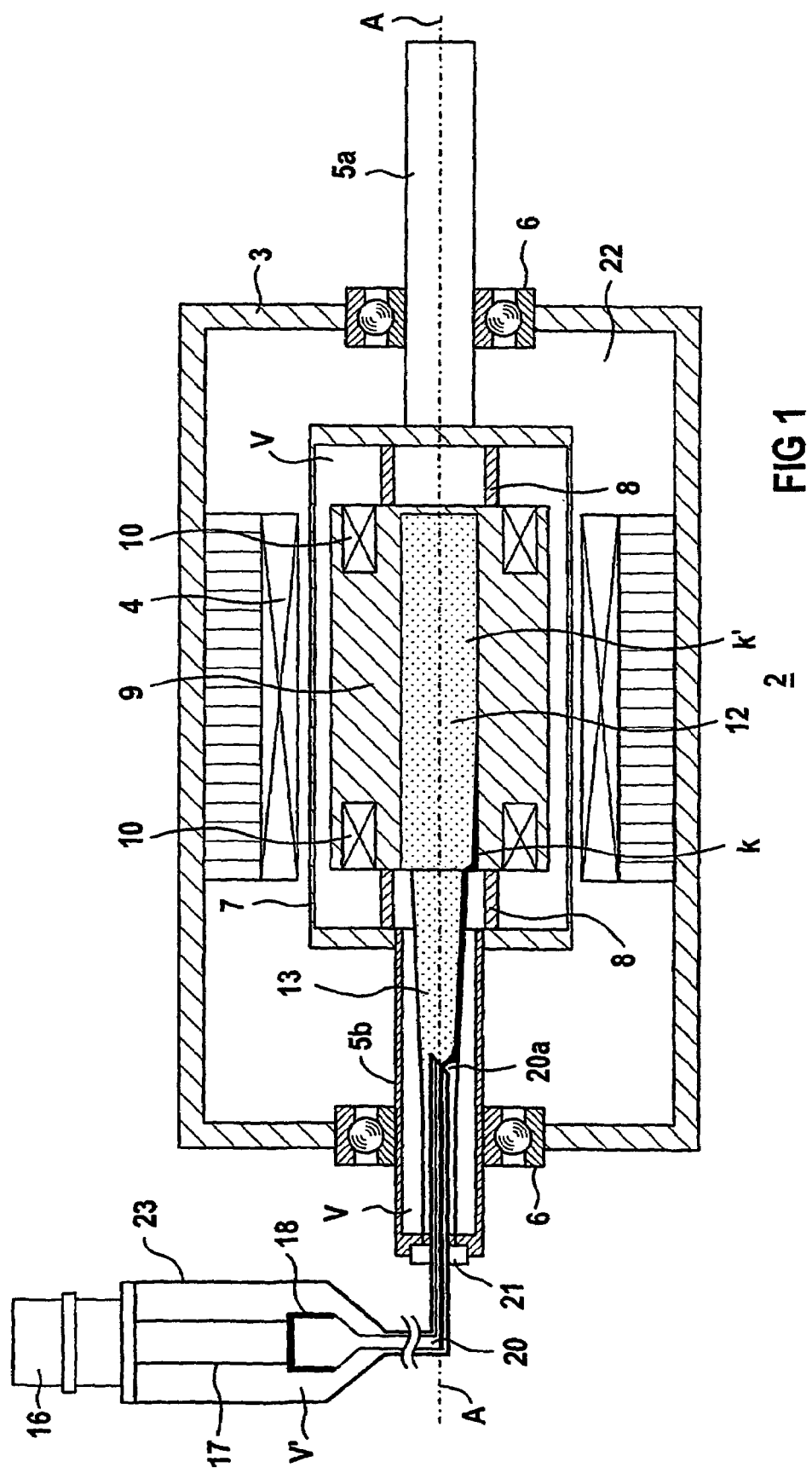
FIG. 1 shows an embodiment of a superconducting device having a rotor and an associated refrigeration unit.

Reference will now be made in detail to the preferred embodiments of the present invention, examples of which are illustrated in the accompanying drawings, wherein like reference numerals refer to like elements throughout.

In this case, corresponding parts are provided with the same reference symbols in the figures.

The embodiments of superconducting devices described in the following text with reference to the figures may each in particular relate to a synchronous motor or a generator. The superconducting device has a rotating, superconducting winding, which in principle allows the use of metallic LTS material (low-$T_c$ superconductor material) or oxidic HTS material (high-$T_c$ superconductor material). The following exemplary embodiments assume that the latter material has been chosen. The winding may comprise a coil or a system of coils in a 2-pole, 4-pole or other multipole arrangement. The basic configuration of a superconducting device such as this which, for example, is in the form of a synchronous machine, is shown in FIG. 1, based on the assumption of known embodiments of such machines (see, for example, the US-A document cited initially).

The device, which is denoted in general by 2, has a stationary outer housing 3, which is at room temperature, with a stator winding 4. A rotor 5 is mounted in bearings 6 within the outer housing, and surrounded by the stator winding 4, such that it can rotate about a rotation axis A, and on one side has a solid axial rotor shaft part 5a which is mounted in the corresponding bearing. The bearings 6 may be known mechanical bearings or else magnetic bearings. The rotor has a vacuum vessel 7 in which a winding mount 9 with an HTS winding 10 is held on, for example, hollow cylindrical suspension elements 8 which transmit torque. A cylindrical cavity which extends in the axial direction and is referred to in the following text as the central cavity 12 is provided concentrically with respect to the rotation axis A in this winding mount. The winding mount is in this case designed to be vacuum-tight with respect to this cavity. It closes this cavity on the side facing the rotor shaft part 5a. On the other side, the central cavity 12 is connected to a lateral cavity 13, with a comparatively small diameter. This lateral cavity passes to the exterior out of the area of the outer housing 3 from the area of the winding mount. A tubular rotor shaft part which surrounds this lateral cavity 13 and is mounted in one of the bearings 6 is annotated 5b.

For indirect cooling of its winding 10 via thermally conductive elements, the superconducting device 2 also has a refrigeration unit, of which only a cold head 16 is illustrated. The refrigeration unit may, in particular, be a cryogenic cooler of the Gifford-McMahon type. A pulse tube cooler or split-Stirling cooler is preferably chosen as a regenerative cryogenic cooler. In this case, the cold head 16 and hence all the major further parts of the refrigeration unit should be located outside the rotor 5 and outside the outer housing 3. Additional parts which are required for the refrigeration unit together with the cold head that is to be used, such as hot pressure equalizing containers, filling capillaries, overpressure valves to protect the system against overpressure on heating up, are not shown in the figure but are generally known. The cold part of the cold head 16, which is arranged, by way of example, at a distance of 0.5 up to about a meter to the side of the rotor 5, makes good contact with a refrigerant condenser unit or condensation unit 18 in a vacuum vessel 23 via a body 17 which conducts heat. This condenser unit is connected to a vacuum-insulated, fixed-position heat pipe 20 which projects into the lateral, rotating cavity 13 at the side in an axial area. A sealing device 21, which is not shown in any more detail in the figure but has at least one sealing element which may be in the form of a ferro fluid seal and/or a labyrinth seal and/or a gap seal is used to seal the heat pipe 20 from the lateral cavity 13. The central cavity 12 is connected via the heat pipe 20 and the lateral cavity 13 to the heat exchanging area of the condenser unit 18 such that it is sealed in a gastight manner from the exterior. A refrigerant which is enclosed in these areas is condensed in a circulating process in the condenser unit, which is cooled by the cold head 16, with heat being emitted. The condensate, which has been liquefied in this way, is annotated k and is indicated by a thickened line in the figure, then flows through the heat pipe 20, first of all into the lateral cavity 13 and from there into the central cavity 12. The condensate is in this case transported through the heat pipe by a thermosyphon effect under the influence of the force of gravity and/or a capillary force on the inner wall of the heat pipe, which acts as a "wick". The function of a wick such as this can be optimized by appropriate configuration, for example with the aid of longitudinal ribs or channels to enlarge the surface area, or by cladding of the internal wall. The condensate k then drips into the cavity 13 or 12 at that end 20a of the heat pipe 20 which projects into the lateral cavity 13, and it is possible to reinforce this process by forming a dripping edge at the end 20a of the pipe. The formed region can also be configured such that the dripping process is assisted by gas movement in the rotating internal area, on the basis of the wind from the gaseous part of the refrigerant, by rotation.

The liquid refrigerant or condensate k then evaporates in the interior of the rotor. The refrigerant in the form of vapor is annotated k'. The force of gravity or centrifugal force can possibly still be used to transport the refrigerant, if the transport route of the refrigerant is inclined pointing outwards with respect to the rotation axis. For this purpose, the lateral cavity 13 is configured as a tube whose diameter extends in the direction of the central cavity 12. The refrigerant k', which evaporates with heat being absorbed, then flows through the interior of the heat pipe 20 back into the condenser unit 18. In this case, the return flow is driven by a slight overpressure in the cavity 12, which acts as an evaporator relative to the condenser unit, caused by the production of gas in the evaporator and the liquefaction in the condenser unit.

The refrigerant that is used may, for example, be hydrogen (boiling temperature 20.4 K at normal pressure, triple point at 14 K, critical point at 30 K and 8 bar), neon (boiler temperature 20.1 K at normal pressure, triple point at 25 K, critical point at 42 K and 20 bar), nitrogen (boiling temperature 77.4 K at normal pressure, triple point at 65 K, critical point at 125 K and 35 bar), argon (boiling temperature 87.3 K at normal pressure, triple point at 85 K, critical point at 145 K and 39 bar) or else a mixture of two or more of these substances. Intermediate temperatures can also easily be achieved by using mixtures of, for example, nitrogen with oxygen or else with methane.

A heat pipe which is coupled in a stationary manner to a refrigeration machine is thus provided for the superconducting device. In this case, the refrigerant is passed to the cryogenic area, with the transition between stationary and rotating parts being made by dripping liquid, and the return path being made by flowing gas.

The winding former 9 should be designed to be sufficiently thermally conductive; that is to say it has highly thermally conductive parts between its wall to the central cavity 12 and the winding 10. In this way, the winding is thermally coupled to the cold head 16 of the refrigeration unit in a simple manner via the winding former 9, the refrigerant k and k', the condenser unit 18 and the body 17 which conducts heat. If necessary, the heat conduction can be improved by measures to enlarge the heat exchanging surfaces for the gaseous refrigerant k', for example by providing ribs in the circumferential direction on the winding mount wall of the central cavity 12.

In order to transport the liquid phase of the refrigerant k better within the heat pipe 20, this can also be equipped in a manner known per se with fittings in the form of a so-called "wick", for example with a stainless steel wire foam or a surface whose area has been enlarged by grooves. In addition to the transport of the liquid phase, as illustrated in the figure, in the horizontal part of the heat pipe 20, transportation against the force of gravity is, of course, also possible.

The parts/containers which surround the refrigerant k or k' must, of course, be protected against the conducted ingress of heat. A vacuum surround is therefore expediently provided as thermal insulation for them, in which case, if necessary, additional insulation such as superinsulation or insulation foam can also be provided in the corresponding vacuum areas. The vacuum which is enclosed by the vacuum vessel 7 is annotated V in FIG. 1. This also surrounds the tube which encloses the lateral cavity 13 and extends as far as the seal 21. The vacuum which surrounds the heat pipe 20 as well as the condenser device 18 and the body 17 which conducts heat is annotated V'. If required, a reduced pressure can also be produced in the area 22 which surrounds the rotor 5 and encloses the outer housing 3.

Figure 2:
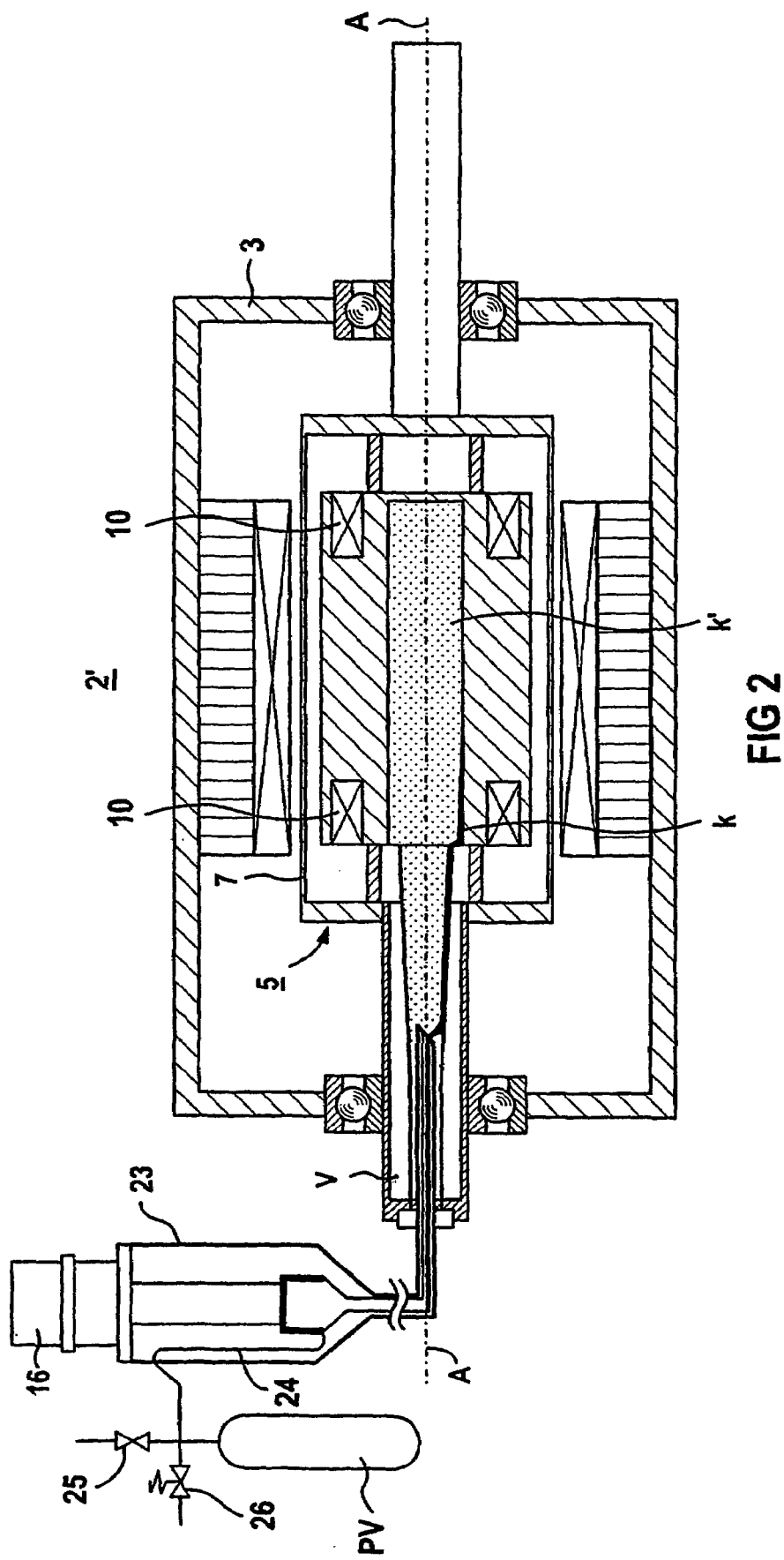
FIG. 2 shows one specific refinement of this device as shown in FIG. 1.

In the embodiment of a superconducting device 2 with a rotor 5 as illustrated in FIG. 1, the device 2 is filled on a one-off basis with gaseous refrigerant k'. When the refrigeration unit is switched off and the cold parts heat up, the pressure in the tube and cavity system will rise due to vaporization of the refrigerant. In this case, the final pressure depends on the enclosed volumes and the amount of refrigerant in the system. If, by way of example, neon at about 1 bar and 27 K and with a minimal amount of liquid k is used as the refrigerant, it can be assumed that the pressure will be more than 12 bar after heating up to room temperature at about 300 K. Since this pressure places a load on the rotating seal 21, it may if required be advantageous to provide an external, hot buffer volume. If this volume PV is n-times the cold volume of the refrigerant k, k', the pressure rise when hot can be reduced to 1:(n+1) times, in this way. FIG. 2 shows a corresponding configuration of the superconducting device as shown in FIG. 1. There, 2' denotes the entire superconducting device, PV the buffer volume, 25 a filling valve, from which the system can be filled with gaseous refrigerant k' via a filling capillary 24, and 26 denotes a pressure relief valve. The other parts of the machine correspond to those in the embodiment of the superconducting device 2 shown in FIG. 1.

The invention has been described in detail with particular reference to preferred embodiments thereof and examples, but it will be understood that variations and modifications can be effected within the spirit and scope of the invention.

The invention claimed is:

1. A superconducting device, comprising:
    a rotor which is rotatable about a rotation axis that defines an axial direction;
    a thermally conductive winding mount;
    a superconducting winding having conductors arranged in the winding mount;
    a central cavity being surrounded by the winding mount, the central cavity substantially projecting through the entire length of the winding mount in the axial direction, wherein the conductors of the superconducting winding are thermally connected to the central cavity via the winding mount;
    a connecting cavity laterally connected to the central cavity to rotate with the central cavity and passing from an area of the winding mount to an area outside of the rotor;
    a cold head located in a fixed manner outside the rotor and thermally connected to a condenser unit for condensation of a refrigerant; and
    a stationary refrigerant transfer pipe coupled to the condenser unit, wherein the transfer pipe projects axially into the connecting cavity, the refrigerant transfer pipe, the connecting cavity and the central cavity being filled with the refrigerant such that condensed refrigerant passes from the condenser unit via the refrigerant transfer pipe into the connecting cavity and from the connecting cavity into the central cavity, and vaporized refrigerant passes from the central cavity via the same connecting cavity and the same refrigerant transfer pipe back to the condenser unit.

2. The device as claimed in claim 1, wherein
    the central cavity is closed on a first side by the winding mount and open on a second side to the connecting cavity,
    the connecting cavity is sealed on a side opposite the central cavity by a sealing device, and
    the sealing device has stationary and rotating parts.

3. The device as claimed in claim 2, wherein the sealing device has at least one seal selected from the group consisting of ferro fluid seals, labyrinth seals, and gap seals.

4. The device as claimed in claim 1, wherein the condenser unit is part of a regenerative cryogenic cooler.

5. The device as claimed in claim 4, wherein the cryogenic cooler is at least one cooler selected from the group consisting of a pulse tube cooler, a split Stirling cooler, and a Gifford-McMahon cooler.

6. The device as claimed in claim 1, wherein the cold head is a multistage cold head.

7. The device as claimed in claim 6, wherein the cold head has first and second refrigeration stages, with the first stage being thermally connected to an electricity supply or to a radiation shield, and the second stage being thermally connected to the condenser unit.

8. The device as claimed in claim 1, wherein the cold head maintains the superconducting winding at a temperature of below 77 K.

9. The device as claimed in claim 1, wherein the conductors of the superconducting winding contain a metallic low-$T_c$ superconductor material or a metal-oxide high-$T_c$ superconductor material.

10. The device as claimed in claim 1, wherein the heat pipe has a dripping edge at an end which projects into the connecting cavity such that the refrigerant drips from the heat pipe into the connecting cavity.

11. The device as claimed in claim 1, wherein the connecting cavity widens in the direction of the central cavity.

12. The device as claimed in claim 1, wherein the refrigerant flows based on at least one of a thermosyphon effect and a heat pipe effect.

13. The device as claimed in claim 1, wherein the rotor, the winding mount, the superconducting winding and the pipe are vacuum-insulated.

14. The device as claimed in claim 1, wherein the central cavity is cylindrical.

15. The device as claimed in claim 3, wherein the condenser unit is part of a regenerative cryogenic cooler.

16. The device as claimed in claim 15, wherein the cryogenic cooler is at least one cooler selected from the group consisting of a pulse tube cooler, a split Stirling cooler, and a Gifford-McMahon cooler.

17. The device as claimed in claim 16, wherein the cold head is a multistage cold head.

18. The device as claimed in claim 17, wherein the cold head has first and second refrigeration stages, with the first stage being thermally connected to an electricity supply or to a radiation shield, and the second stage being thermally connected to the condenser unit.

19. The device as claimed in claim 18, wherein the cold head maintains the superconducting winding at a temperature of below 77 K.

20. The device as claimed in claim 19, wherein the conductors of the superconducting winding contain a metallic low-$T_c$ superconductor material or a metal-oxide high-$T_c$ superconductor material.

21. The device as claimed in claim 20, wherein the pipe has a dripping edge at an end which projects into the connecting cavity such that the refrigerant drips from the pipe into the connecting cavity.

22. The device as claimed in claim 21, wherein the connecting cavity widens in the direction of the central cavity.

23. The device as claimed in claim 22, wherein the refrigerant flows based on at least one of a thermosyphon effect and a heat pipe effect.

24. The device as claimed in claim 23, wherein the rotor, the winding mount, the superconducting winding and the heat pipe are vacuum-insulated.

25. A superconducting device, comprising:
a rotor which is rotatable about a rotation axis that defines an axial direction;
a thermally conductive winding mount;
a superconducting winding having conductors arranged in the winding mount;
a central cavity surrounded by the winding mount, the cylindrical cavity extending in the axial direction and substantially projecting through the entire length of the winding mount wherein the conductors of the superconducting winding are thermally connected to the central cavity via the winding mount;
a connecting cavity laterally connected to the central cavity, the connecting cavity rotating with the central cavity and passing from an area within the winding mount to an area outside of the rotor
a refrigerated cold head; and
a stationary refrigerant transfer pipe coupled to the cold head, which pipe projects axially into the connecting cavity, the refrigerant transfer pipe, the connecting cavity and the central cavity being filled with refrigerant such that condensed refrigerant passes from the condenser unit via the refrigerant transfer pipe into the connecting cavity and from the connecting cavity into the central cavity, and vaporized refrigerant passes from the central cavity via the same connecting cavity and the same refrigerant transfer pipe back to the cold head.

* * * * *